United States Patent
Bruno et al.

(10) Patent No.: US 9,235,446 B2
(45) Date of Patent: Jan. 12, 2016

(54) PARALLEL COMPUTING EXECUTION PLAN OPTIMIZATION

(75) Inventors: Nicolas Bruno, Bellevue, WA (US);
Jingren Zhou, Bellevue, WA (US);
Srikanth Kandula, Redmond, WA (US);
Sameer Agarwal, Berkeley, CA (US);
Ming-Chuan Wu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 629 days.

(21) Appl. No.: 13/530,490

(22) Filed: Jun. 22, 2012

(65) Prior Publication Data
US 2013/0346988 A1 Dec. 26, 2013

(51) Int. Cl.
G06F 9/46 (2006.01)
G06F 17/30 (2006.01)
G06F 9/50 (2006.01)

(52) U.S. Cl.
CPC .................... *G06F 9/5066* (2013.01)

(58) Field of Classification Search
None
See application file for complete search history.

(56) References Cited

U.S. PATENT DOCUMENTS

| | | | |
|---|---|---|---|
| 7,958,113 B2 * | 6/2011 | Fan et al. | 707/718 |
| 2006/0031189 A1 * | 2/2006 | Muras et al. | 707/2 |
| 2008/0177722 A1 | 7/2008 | Lohman et al. | |
| 2008/0195577 A1 | 8/2008 | Fan et al. | |
| 2009/0216709 A1 * | 8/2009 | Cheng et al. | 707/2 |
| 2010/0162245 A1 * | 6/2010 | Plancarte et al. | 718/101 |
| 2010/0175049 A1 | 7/2010 | Ramsey et al. | |
| 2010/0198811 A1 | 8/2010 | Wiener et al. | |
| 2010/0241828 A1 | 9/2010 | Yu et al. | |
| 2011/0276962 A1 * | 11/2011 | Chambers et al. | 718/1 |
| 2011/0302151 A1 * | 12/2011 | Abadi et al. | 707/714 |

OTHER PUBLICATIONS

Ananthanarayanan et al., "Reining in the Outliers in Map-Reduce Clusters using Mantri", In Proceedings of the 9th USENIX Symposium on Operating Systems Design and Implementation, Oct. 2010, 14 pages.
Avnur et al., "Eddies: Continuously Adaptive Query Processing", Proceedings of ACM SIGMOD International Conference on Management of Data, May 2000, 12 pages.
Babu et al., "Proactive Re-Optimization", Proceedings of SIGMOD'05, Jun. 2005, 12 pages.
Babu, "Towards Automatic Optimization of MapReduce Programs", Proceedings of the 1st ACM Symposium on Cloud Computing (SoCC'10), Jun. 2010, 6 pages.
Bruno et al., "Exploiting Statistics on Query Expressions for Optimization", In Proceedings of ACM SIGMOD, Jun. 2002, pp. 263-274.

(Continued)

*Primary Examiner* — Tammy Lee
(74) *Attorney, Agent, or Firm* — Brian Haslam; Kate Drakos; Micky Minhas

(57) ABSTRACT

The use of statistics collected during the parallel distributed execution of the tasks of a job may be used to optimize the performance of the task or similar recurring tasks. An execution plan for a job is initially generated, in which the execution plan includes tasks. Statistics regarding operations performed in the tasks are collected while the tasks are executed via parallel distributed execution. Another execution plan is then generated for another recurring job, in which the additional execution plan has at least one task in common with the execution plan for the job. The additional execution plan is subsequently optimized based at least on the statistics to produce an optimized execution plan.

20 Claims, 6 Drawing Sheets

(56) References Cited

OTHER PUBLICATIONS

Chaiken et al., "SCOPE: Easy and Efficient Parallel Processing of Massive Data Sets", Proceedings of the Very Large Database (PVLDB) Endowment, Aug. 2008, pp. 1265-1276.
Chambers et al., "FlumeJava: Easy, Efficient Data-Parallel Piplines", In Proceedings of the 2010 ACM SIGPLAN Conference on Programming Language Design and Implementation (PDI'10), Jun. 2010, pp. 363-375.
Chattopadhyay et al., "Tenzing A SQL Implementation on the MapReduce Framework", Proceedings of the 37th International Conference on Very Large Databases (VLDB Endowment), vol. 4, No. 12, Aug.-Sep. 2011, pp. 1318-1327.
Chowdhury et al., "Managing Data Transfers in Computer Clusters with Orchestra", Proceedings of ACM Conference on Special Interest Group on Data Communication (SIGCOMM'11), Aug. 2011, 12 pages.
Durand et al., "Loglog Counting of Large Cardinalities", In Proceedings of 11th Annual European Symposium on Algorithms (ESA 2003), Lecture Notes in Computer Science, vol. 2832, Sep. 2003, pp. 605-617.
Galindo-Legaria et al., "Statistics on Views", Proceedings of the 29th Very Large Database (VLDB) Conference, Sep. 2003, 11 pages.
Gunda et al., "Nectar: Automatic Management of Data and Computation in Datacenters", Microsoft Research, Oct. 2010, 14 pages.
Herodotou, et al. "Starfish: A Self-tuning System for Big Data Analytics"Proceedings of the 5th Biennial Conference on Innovative Data Systems Research (CIDR'11), Jan. 2011, pp. 261-272.
Hindman et al., "Mesos: A Platform for Fine-Grained Resource Sharing in the Data Center", University of California, Berkley, Sep. 2010, 14 pages.
Isard et al., "Quincy: Fair Scheduling for Distributed Computing Clusters", In Proceedings of 22nd ACM Symposium on Operating Systems Principles, Oct. 2009, 20 pages.
Kabra et al., "Efficient Mid-Query Re-Optimization of Sub-Optimal Query Execution Plans", Proceedings of ACM SIGMOD'98 International Conference on Management of Data, Jun. 1998, pp. 106-117.
Ke et al., "Optimizing Data Partitioning for Data-Parallel Computing", Proceedings of the 13th USENIX Workshop on Hot Topics in Operating Systems (HotOS XIII), May 2011, 5 pages.
Larson et al., "Cardinality Estimation Using Sample Views with Quality Assurance", Proceedings of ACM SIGMOD'07, Jun. 2007, 12 pages.
Lee et al., "Parallel Data Processing with MapReduce: A Survey", SIGMOD Record, vol. 40, No. 4, Dec. 2011, pp. 11-20.
Manku et al., "Approximate Frequency Counts over Data Streams", Proceedings of the 28th VLDB Conference, Aug. 2002, 12 pages.
Mishra, "Queries, Data, and Statistics: Pick Two", A Thesis Submitted in the Conformity with Requirements for the Degree of Doctor of Philosophy, Graduate Department of Computer Science, University of Toronto, 2010, 211 pages.
Murray et al., "CIEL: A Universal Execution Engine for Distributed Data-Flow Computing", Proceedings of NSDI 2011, 8th USENIX Symposium on Networked Systems Design and Implementation, Mary—Apr. 2011, 14 pages.
Olston et al., "Pig Latin: A Not-So-Foreign Language for Data Processing", Proceedings of ACM SIGMOD'08, Jun. 2008, 12 pages.
Peng et al., "Large-scale Incremental Processing Using Distributed Transactions and Notifications", Proceedings of the 9th USEIX Symposium on Operating Systems Design and Implementation (OSDI'10), Oct. 2010, 14 pages.
Rasmussen et al., "TritonSort: A Balanced Large-Scale Sorting System", Proceedings of the 8th USENIX Symposium on Networked Systems Design and Implementation (NSDI'11), Mar.-Apr. 2011, 14 pages.
Shieh et al., "Sharing the Data Center Network", Proceedings of the 8th USENIX Symposium on Networked Systems Design and Implementation (NSDI'11), Mar.-Apr. 2011, 14 pages.
Thusoo et al., "Hive—A Warehousing Solution Over a Map-Reduce Framework", Proceedings of International Conference on Very Large Databases (VLDB'09 Endowment), Aug. 2009, 4 pages.
Zaharia et al., "Delay Scheduling: A Simple Technique for Achieving Locality and Fairness in Cluster Scheduling", In proceedings of of EuroSys 2010, European Chapter of SIGOPS, Apr. 2010, 14 pages.
Zaharia et al., "Improving MapReduce Performance in Heterogeneous Environments", 8th USENIX Symposium on Operating Systems and Design Implementation (OSDI'08), Dec. 2008, pp. 29-42.
Zaharia et al., "Spark: Cluster Computing with Working Sets", Electrical Engineering and Computer Sciences Department, University of California, Berkely, May 2010, 7 pages.

* cited by examiner

PARALLEL COMPUTING EXECUTION PLAN OPTIMIZATION

BACKGROUND

Map-reduce is a data processing system that supports distributed processing of an input across a cluster of computing nodes. Traditionally, the map step of the map-reduce data processing system involves a root level computing node dividing an input into smaller sub-problems, and distributing the smaller sub-problems to a cluster of lower level computing nodes for processing. Each lower level computing node may process a corresponding sub-problem and return a solution to the root level computing node. In the reduce step of the map-reduce data processing system, the root level computing node may collect the solutions from the lower level computing nodes and combine the solutions to form an output that is the solution to the input. In some instances, there may be multiple lower levels of computing nodes.

However, current map-reduce data processing systems are no longer limited to performing map operations and then reduce operations. Instead, current map-reduce data processing system use logical graphs to process operations. As a result, current map-reduce data processing systems are highly dependent on an initial selection of an appropriate execution plan. The selection of an appropriate execution plan may include the selection of properties for the map-reduce code used, properties of the data to be processed, and properties related to the interactions of the data and the code. However, such properties may be difficult to estimate due to the highly distributed nature of map-reduce data processing systems and the fact that the systems offer users the ability to specify arbitrary code as operations on the data. As a result, today's map-reduce data processing systems may use fixed apriori estimates to choose execution plans. In many instances, the use of such fixed a prior estimates may result in poor data processing performance.

SUMMARY

Described herein are techniques for using statistical data collected during the execution of tasks for a job by a distributed data parallel computation system to optimize the performance of the tasks or similar recurring tasks of another job. In various embodiments, the distributed data parallel computation system may be a map-reduce data processing system that executes tasks on multiple computing devices. The jobs that are executed by the map-reduce data processing system are specified by execution plans. An execution plan may designate tasks that include operations to be performed in a distributed fashion by the multiple computing devices of the map-reduce data processing system. For example, the execution plan may encode, among other things, the sequence in which operations are to be performed, the partition of data in a data table, the degree of parallelism for each operation, and the implementations of the operations.

The statistics that are collected during the execution of a job may include statistics about resource usage, computation cost, and cardinality. Such statistics may be used by an optimizer of the map-reduce data processing system to optimize an execution sequence for a set of operations, a degree of parallelism for the execution of operations, the number of partitions to use for the execution of operations, particular operations to fit within a single task, and/or other optimizations. The optimization may result in an optimized execution plan that uses less computation resources for the job or a similar recurring job. Such an optimized execution plan may be superior to an optimized execution plan for the same job that is produced using solely fixed apriori estimates.

In at least one embodiment, an execution plan for a job is initially generated, in which the execution plan includes tasks. Statistics regarding operations performed in the tasks are collected while the tasks are executed via parallel distributed execution. Another execution plan is then generated for another recurring job, in which the additional execution plan has at least one task in common with the execution plan for the job. The additional execution plan is subsequently optimized based on the statistics to produce an optimized execution plan.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

Described herein are techniques for using statistical data collected during the execution of tasks for a job by a distributed data parallel computation system to optimize the performance of the task or similar recurring tasks of another job. In various embodiments, the distributed data parallel computation system may be a map-reduce data processing system that executes tasks on multiple computing devices. The jobs that are executed by the map-reduce data processing system are specified by execution plans. An execution plan may designate tasks that include operations to be performed in a distributed fashion by the multiple computing devices of the map-reduce data processing system. For example, the execution plan may encode, among other things, the sequence in which operations are to be performed, the partition of data in a data table, the degree of parallelism for each operation, and the implementations of the operations.

The statistics that are collected during the execution of a job may include statistics about resource usage, computation cost, and cardinality. Such statistics may be used by an optimizer of the map-reduce data processing system to optimize an execution sequence for a set of operations, a degree of parallelism for the execution of operations, the number of partitions to use for the execution of operations, particular operations to fit within a single task, and/or other optimizations.

The optimization may result in an optimized execution plan with reduced computation cost (e.g., computation resources, processing time, etc.) for the job or a similar recurring job. Various examples of techniques for using statistics collected during the execution of tasks to optimize the performance of data parallel computations in accordance with various embodiments are described below with reference to FIGS. 1-6.

Example Scheme

Figure 1:
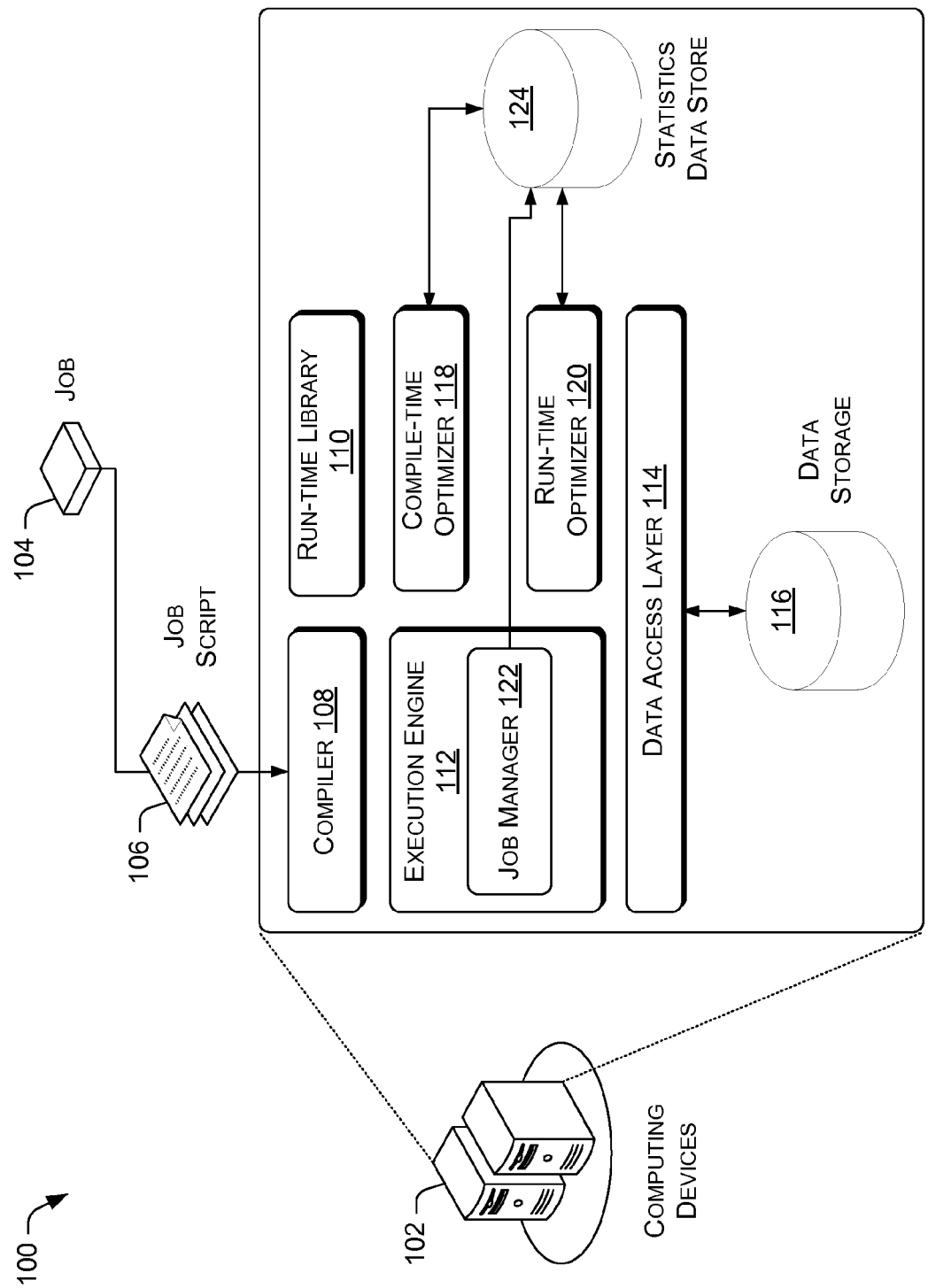
FIG. 1 is a block diagram that illustrates an example map-reduce data processing system that uses collected statistical data to optimize data parallel task executions.

FIG. 1 is a block diagram that illustrates an example map-reduce data processing system 100 that uses collected statistical data to optimize data parallel task executions. The map-reduce data processing system 100 may be a distributed data parallel computation system that is implemented using multiple computing devices 102. The map-reduce data processing system 100 may execute a job 104 that is specified by a job script 106. For example, the job 104 may be the analysis of data that are in a click log for a website. In various embodiments, the map-reduce data processing system 100 may formulate an execution plan that reduces the job 104 into a set of tasks that are to be performed by the computing devices 102, which are the computing nodes in the map-reduce data processing system 100. Each of the computing nodes may perform one or more operations of a task and return a solution to a root level computing node that hosts a job manager. The job manager may then collect the solutions from the nodes and combine the solutions to form an output that is the result for the job 104. Each of the computing devices 102 may be a server, a desktop computer, or any other electronic device or virtual machine that is capable of processing data. The computing devices 102 may be linked together via a network, such as a Local Area Network (LAN), a Wide Area Network (WAN), and/or a combination of both. The map-reduce data processing system 100 may include a compiler 108, a run-time library 110, an execution engine 112, a data access layer 114, data storage 116, an compile-time optimizer 118, and a run-time optimizer 120.

The job script 106 for a job 104 that is to be processed by the map-reduce data processing system 100 may be written in a declarative language. In various embodiments, the declarative language may be a structured query language (SQL)-type language. The declarative language may enable users to describe what jobs want to achieve instead of specifying how to implement and achieve the results. There may be multiple ways to execute a job. The compiler 108 translates the job script 106 into an optimal execution plan by generating code for executing multiple tasks. In various embodiments, the compiler 108 may perform estimates on an amount of data that each operation in the multiple tasks may consume or generate for several different alternative execution plans. In other words, the compiler 108 may use statistical model, heuristics, or rules to guess the computation costs of various generated execution plans, and then select the execution plan that consumes the least amount of computation resources (e.g., processing power, memory, and/or processing time) to implement. However, in many instances, due to errors in prediction, the selected execution plan may not in fact consume the least amount of computation resources.

The execution plan that is selected by the compiler 108 may be in the form of a directed acyclic graph in which the graph edges represent data flow and graph nodes represent operations that may be executed in parallel. The compiler 108 may use the run-time library 110 to specify functions that are to be carried out during the execution of the tasks, such as functions for managing inputs and output, managing the use of memory, and/or so forth.

The execution engine 112 may execute the tasks specified by the execution plan. The execution engine 112 may use a job manager 122 to orchestrate the execution of the tasks. In various embodiments, the job manager 122 may issue tasks for execution when their inputs are ready, select particular computing devices to run specific tasks, and react to result outliers and execution failures. The job manager 122 may perform such duties by inserting monitor codes into the tasks being executed to provide feedback messages, also known as heartbeat messages, to the job manager 122. By monitoring the feedback messages, the job manager 122 is able to track and direct the execution of tasks and provide fault-tolerance during execution.

The data access layer 114 may respond to the requests of the execution engine 112 for data blocks from the data storage 116 and provide the data blocks to the execution engine 112. The data storage 116 may include multiple computing devices that store the data blocks to be processed according to a job, such as the job 104. The data blocks may be in the form of data tables that include columns and rows of data.

In various embodiments, the job manager 122 may be further configured to insert collector codes into the tasks. The collector codes differ from the monitor codes in that the collector codes may collect statistics on the data flow of the tasks. For example, an operation of a task may be instrumented with collector codes, also known as collectors, on its inputs, outputs, intermediate products, and/or so forth. The statistics gathered by the collectors on the execution of the tasks are fed to the job manager 122. In turn, the job manager 122 may store the statistics in the statistics data store 124.

The compile-time optimizer 118 may use the statistics gathered by the job manager 122 from the execution of a particular job to optimize the execution of a subsequent recurring job at compile-time. In many instances, a job that is to be processed by the map-reduce data processing system 100 may be a recurrence of a previous job. Accordingly, the execution plan for a current job and the execution plan for a subsequent recurring job may have at least one task in common. For example, click logs for a website may be processed on a daily basis. Accordingly, a job to process a click log for a current day may involve the execution engine 112 performing a similar set of tasks as the tasks that are performed in a previous day by the execution engine 112, despite differences in the data values that are in the two clicks logs. In such a scenario, the compile-time optimizer 118 may use the statistics gathered by the job manager 122 for one job to modify an execution plan for the subsequent recurring job. In this way, the execution plan for the subsequent recurring job may be optimized to consume less computation resources than possible without the modification.

The run-time optimizer 120 may use the statistics gathered by the job manager 122 to modify an execution plan for the job 104 while the tasks of the execution plan are being executed by the execution engine 112. For instances, the run-time optimizer 120 may perform continuous analysis of the statistics gathered by the job manager 122 as operations in the tasks are executed to determined whether one or more operations are to be canceled, added, or reordered in relation to other operations. Accordingly, such on-the-fly optimizations may result in reduction in the consumption resources for the overall execution of the job 104.

The optimization provided by the compile-time optimizer 118 or the run-time optimizer 120 may enable the map-reduce data processing system 100 to enhance the execution plans that are provided by the compiler 108. For instance, the operations in an execution plan for a job may start off reading large amounts of data but each operation may produced less output than its input. As such, there may little data to process after a small number of consecutive operations. However, optimization may reduce the number parallelism on many operations at the tail end of the job, which may save scheduling overhead and prevent the performance of unnecessary tasks. Alternatively, optimization may combine multiple operations in the tail end of a job into a single operation, i.e., one group of tasks may execute such operations in parallel to avoid needless checkpoints to disk. Another optimization may use broadcast joins instead of pair-wise joins to join data process by one or more operations, thereby saving on network shuffle and disk access with respect to the computing devices 102.

In other instances, optimization may order a pair of operations so that the more selective operation executes prior to the execution of the less selective operation, with the constraint that the operations produce the same output regardless of the order in which the operations are executed. The specific ordering may reduce the amount of work performed by the execution engine 112, thereby saving computing time, disk access to the computing devices 102, and/or network shuffle. Such ordering of operations may be applied to independent operations (i.e., operations that operate on different data columns) or commutative operations.

In a further instance, optimization may assist the compiler 108 in selecting the correct number of parallel instances for each operation in an execution plan. Selecting too few instances may cause an operation to become a bottleneck in the distributed data parallel processing performed by the map-reduce data processing system 100. On the other hand, selecting too many instances of the operation may lead to needless per-task scheduling, per-task queuing, and other excessive startup overhead. Accordingly, achieving a balance that ensures each operation has an appropriate amount of parallelism and takes approximately the same amount of time to execute may significantly improve overall performance.

However, achieving such balance may be challenging because the computing costs of each of the operations is difficult to predict. The computation costs may depend on the amount of data process and the types of computations performed by the operators. Further, the cost of an operation may also depend on the type of data to be operated on by the operation. For example, a complex sentence may take longer to translate than a simpler one of the same length. Moreover, it is often difficult to use late binding, which is deferring the selection of the amount of parallel instances for each operation to runtime, because local changes may have global impacts. For example, the number of partitions outputted by the map phase may restrict the maximum number of reduce tasks at the reduce stage. However, the compile-time optimizer 118 or the run-time optimizer 120 may overcome such challenges by using the statistics obtained by the job manager 122 to estimate the computing costs of each operation, and select the correct number of parallel instances for each operation in an execution plan.

In an additional instance, optimization may be used by the compile-time optimizer 118 or the run-time optimizer 120 to assist the execution engine 112 in avoiding skews in the partition of data to be processed and to perform re-partition of the data on an as-needed basis. Incorrect portioning of data in an effort to save on network cost (e.g., network shuffle) may cause one or more reduce tasks to end up with lots of data to process while leaving the remaining reduce tasks without data to process. Such an imbalance may cause the slowdown of overall parallel processing performed by the map-reduce data processing system 100. However, optimization based on the statistics obtained by the job manager 122 may assist the execution engine 112 in avoiding skewed partitions and/or re-partitions.

Statistics Gathering Components

Figure 2:
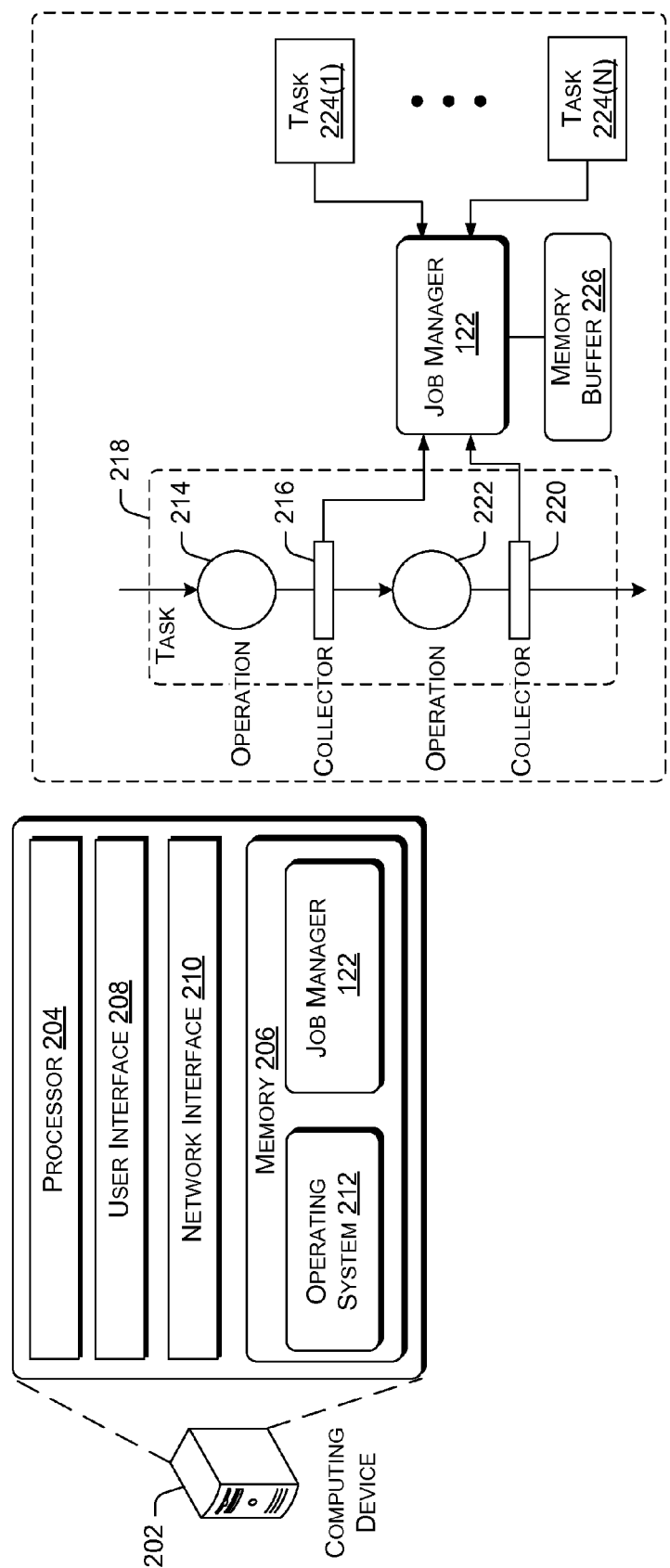
FIG. 2 is an illustrative diagram that shows example components of a computing device that implements a job manager for collecting statistical data on task performance.

FIG. 2 is an illustrative diagram that shows example components of a computing device 202 that implements a job manager for collecting statistical data on task performance. The computing device 202 may be one of the computing devices 102.

The computing device 202 may include a processor 204, memory 206, a user interface 208, and a network interface 210. The memory 206 may be implemented using computer readable media, such as computer storage media. Computer-readable media includes, at least, two types of computer-readable media, namely computer storage media and communication media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that may be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

The user interface 208 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The network interface 210 may include wireless and/or wireless communication interface components that enable the computing device 202 to transmit and receive data via a network. In various embodiments, the wireless interface component may include, but is not limited to cellular, Wi-Fi, Ultra-wideband (UWB), Bluetooth, satellite transmissions, and/or so forth. The wired interface component may include a direct I/O interface, such as an Ethernet interface, a serial interface, a Universal Serial Bus (USB) interface, and/or so forth. As such, the computing device 202 may have network capabilities. For example, the computing device 202 may exchange data with other electronic devices (e.g., laptops computers, servers, etc.) via one or more networks, such as the Internet.

The memory 206 of the computing device 202 may store the operating system 212 and the job manager 122. The operating system 212 may include components that enable the computing device 202 to receive data via various inputs (e.g., user controls, network interfaces, and/or memory devices), and process the data using the processor 204 to generate output. The operating system 212 may further include one or more components that present the output (e.g., display an image on an electronic display, store data in memory, transmit data to another electronic device, etc.). Additionally, the operating system 212 may include other components that perform various other functions generally associated with an operating system, such as processing data for the job manager 122.

The job manager 122 may insert collectors into tasks. For example, as shown in FIG. 2, a collector 214 may monitor an operation 216 of a task 218, and a collector 220 may monitor an operation 222 of the task 218. The collectors, such as the collectors 216 and 220, may report the collected statistics to the job manager 122. In this way, the job manager 122 may gather statistics on a plurality of tasks that are being performed by the execution engine 112, such as the tasks 224(1)-224(N).

The collectors that are inserted into tasks may be configured to meet certain criteria. For example, since the map-reduce data processing system 100 examines a massive quantity of data in a distributed fashion, it is not possible to have an instrumentation point that is capable of observing all the data. Further, even if such instrumentation can be created, such instrumentation may not scale with the data size. Accordingly, each of the collectors is to be composable, i.e., local statistics obtained by looking at parts of the data may be composed into global statistic for all data.

Further, in order to be applicable over a wide set of jobs, it may be ideal for collectors to have low overhead, i.e., a collector is to consume only a fraction of the computing resources consumed by the associated task. In particular, the memory used by a collector is to scale sub-linearly with data size to limit computation cost, and the statistics are to be collected in a single pass.

Additionally, the statistics gather by the collectors are to be unambiguous, precise, and provide high coverage. Unambiguous means that the statistics obtained by a collector are to contain metadata that describes the location in a directed acyclic graph (e.g., a query tree) at which the statistics are gathered. Precision is a metric that relates to accuracy, and the accuracy of any optimization that results from the statistic are to at least match the accuracy of the properties of the algorithmic techniques that are used to collect the statistics. With respect to coverage, a job that is being executed would ideally be provided with as many collectors as possible to observe the greatest amount of data points. However, in order to keep computation cost low, operations whose impact on data is predictable (e.g., the input size of a sort operation may be identical to the output size) may be ignored. Further, statistics are to be collected with respect to data that have further ramifications. For instance, collectors may be deployed to collect statistics on data in table columns with values that will, at some later point in the job, be used in expressions (e.g., record stats for col if select col= . . . , join by col= . . . , or reduce on col follows).

Accordingly, based at least on these criteria, the job manager 122 may interpose collectors at key points in the data flow of a job. The collectors may be pass-through operators that keep negligible amounts of state data and add minimal overhead. When a task finishes, all statistics may be ferried to the job manager 122, so that the job manager 122 may compose the statistics for storage in the statistics data store 124. Generally speaking, collectors (e.g., the collectors 216 and 220), may collect statistics about resource usage, (e.g., CPU usage, memory usage, etc.) and data properties (e.g., cardinality, number of distinct values, etc.). For example, at least some of the statistics collected by the collectors are listed below in Table I.

TABLE 1

Statistics Collected for Optimization

| Type | Description | Granularity |
| --- | --- | --- |
| Data Properties | Cardinality | Query Subgraph |
| | Average row length | Query Subgraph |
| | Number of distinct values | Column within Subgraph |
| | Heavy hitter values and their frequency | Column within Subgraph |
| Code Properties (Operation Costs) | CPU and memory used per data read and write | Task |
| Leading Statistics | Hash histogram | Column within Subgraph |
| | Exact Sample | Column within Subgraph |

In various embodiments, the data properties, i.e., the number of rows and the average length collected by a group of collectors may inform whether data shrinks or grows, as well as by how much, as the data flows through a query subgraph. A query subgraph, as used herein, may refer to data that is operated on by a chain of operators before the data reaches a collector. The total number of rows after a particular operation may be the sum of the number of rows seen by the group of collectors that observed the output of the particular operation across all tasks that contain the particular operation.

Further, the job manager 122 may compute the number of distinct values and heavy hitters, i.e., values that are repeated in over a predetermined fraction of the rows, for each column of data being observed. Such statistics may be used by the execution engine 112 to avoid skewing in the partitioning of operations for a current job or a recurring job. In order to do so, the job manager 122 may use various algorithms, such as an algorithm that uses lossy count to find heavy hitters and/or an algorithm that uses hash sketches to count distinct values.

In the use of lossy counting to find heavy hitters, the job manager 122 may identify values that re-occur more frequently than a threshold, such as $\epsilon=0.1\%$ of the data size N. Performing such identification in a single pass in a naive manner would mean tracking running frequencies of all distinct values, i.e., up to O(N) space. Lossy counting is an approximate streaming algorithm that guarantees that all values with frequency over $\epsilon N$ will be outputted. In other words, lossy counting does not produce false positives or false negatives. Second, the worst case space needed by the lossy counting to do so may be $$\frac{1}{\epsilon}\log(\epsilon N).$$

Third, in lossy counting, the frequency estimated may undercount the true estimate by at most $\epsilon N$. Accordingly, the job manager 122 may use a distributed form of lossy counting. Each collector may employ lossy counting on a subset of data that the task monitored by the collector observes to obtain a corresponding frequency estimate. The job manager 122 may compute heavy hitters over all the data by totaling up the individual frequency estimates produced by the collectors and tallying up all the distinct values.

The use of hash sketches involves the counting of the number of distinct items in a sub-linear state. Using only a O (log N) space, hash sketches may compute this number approximately. In other words, the estimate is a random variable whose mean is the same as the number of distinct values and the standard deviation is small.

As such, the hash sketch technique may at random hash a value, and then use the first few bits of the hash value to select a bit vector and use the remaining bits of the hash value to identify the first non-zero bits and set the corresponding bit in the chosen bit vector. Such a hash sketch may estimate the number of distinct values because ½ of all hash values may be odd and have their first non-zero bit at position 1, $$\frac{1}{2^2}$$

may do so at position 2 and so on. Hence, the maximum bit set in a bit-vector may be proportional to the logarithm of the number of distinct values.

Accordingly, the job manager 122 may use a distributed form of hash sketches. Each collector may maintain local hash sketches and relay its bit vectors to the job manager 122. In turn, the job manager 122 may maintain global bit vectors, such that the $i^{th}$ bit vector is an OR of all the individual $i^{th}$ bit vectors. By doing so, the global hash sketch may be exactly the same as would be computed by one instrumentation point that looks at all the data.

The job manager 122 may collect the processing time and memory used by each task. In at least one embodiment, a task is a multi-threaded process that reads one or more inputs from a disk or over a network but writes its output to a local disk. However, a compiler may compact more than one operation into the same task. Since such operations run within the same thread and exchange data via the memory, the per-operation processing and memory costs are not directly available to the job manager 122. Thus, in order to obtain these per-operation costs, the job manager 122 may initially profile tasks to estimate the relative costs of the individual operations, e.g., $cpu_{op1}=2cpu_{op2}$. With these relative measures, the job manager 122 may estimate the per-operation costs. Profiling tasks involves a few runs per operator with controlled input, and since operators are often re-used, the job manager 122 may use past profiles to perform such estimation.

Leading statistics collected by the job manager 122 may be used to predict behavior of future operators, such as for the purpose of on-the-fly optimization. In various embodiments, the job manager 122 may use collectors to collect histograms and random samples on data table columns of interest at one or more collection points preceding an operation at which those columns may be used. The job manager 122 may use a histogram generator that may be computed in a single pass, with bounded memory and reasonable accuracy. Accordingly, such a histogram generator may build a hash-based histogram with B buckets, which is hash(column value) % B→bucket. The frequency of all entries in each bucket is subsequently counted. In some embodiments, the job manager 122 may use reservoir sampling to pick a constant sized random sample independent of the data flowing through an operation. For example, the job manager 122 may collect K=100 samples for each data table column of interest.

While the collection of statistics as described in FIG. 2 may be handled by a single job manager 122 executing on a computing device 202, the collection of statistics may also be handled by multiple coordinated job managers working cooperative in other embodiments. Each of the one or more job managers may store at least a portion of the collected statistics in a corresponding memory buffer prior to writing them to the statistics data store 124. For example, the job manager 122 may initially store at least a portion of the collected statistics in a corresponding memory buffer 226. Alternatively, each of the one or more job managers may directly write the collected statistics to the statistics data store 124. Further, each of the computing devices 102 illustrated in FIG. 1 may include a processor, user interface, network interface, and/or memory components as described with respect to the computing device 202.

Figure 3:
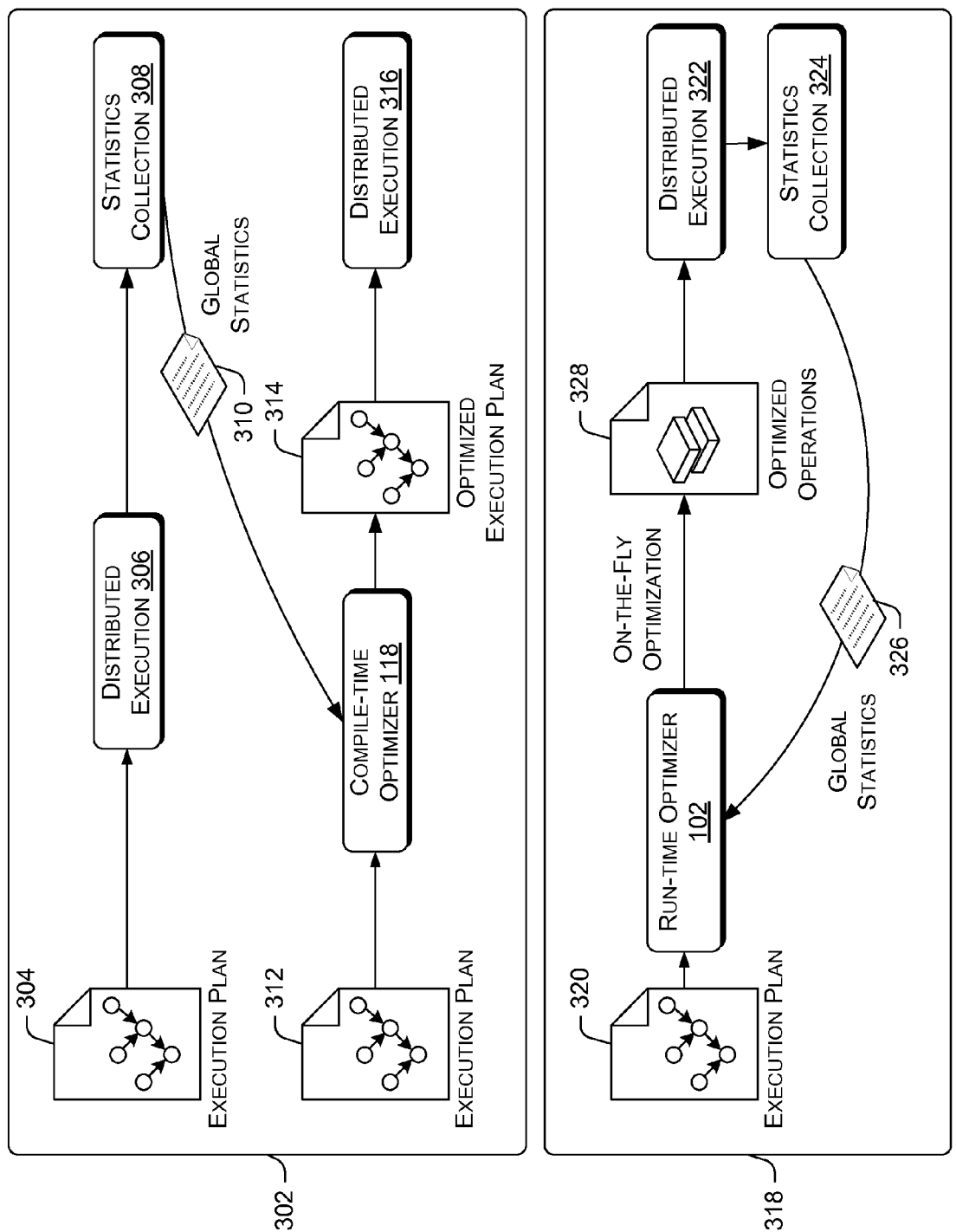
FIG. 3 is an illustrative diagram that shows implementation scenarios for collecting statistical data and using the collected statistical data to optimize data parallel computations.

FIG. 3 is an illustrative diagram that shows implementation scenarios for collecting statistical data and using the collected statistical data to optimize data parallel computations. In scenario 302, an execution plan 304 that is compiled by the compiler 108 of the map-reduce data processing system 100 may be provided to the execution engine 112 for distributed execution 306. In some embodiments, the compiler 108 may have used fixed apriori estimates to select the execution plan 304 as an ideal plan from multiple possible execution plans.

Further, the execution plan 304 may specify tasks including operations that are to be executed. The job manager 122 may insert collectors into one or more tasks that monitor at least one operation of each task. For example, a set of collection codes for a collector may include a few thousand lines of code that are placed into an appropriate location in an operator's data flow. During the distributed execution 306, the job manager 122 may perform statistics collection 308 to gather statistics from the collectors. Statistics from each collector may be sent from the collectors along with task status reports to the job manager 122, at which point the job manager 122 may compose the received statistics into global statistics 310.

Subsequently, the compiler 108 of the map-reduce data processing system 100 may compile an execution plan 312. The execution plan 312 may be for a job that is a recurrence of the job associated with the execution plan 304. Accordingly, the execution plan 312 may specify one or more identical tasks as the execution plan 304. In some embodiments, the compiler 108 may have used fixed apriori estimates to select the execution plan 312 as an ideal plan from multiple possible execution plans for the job.

In such an instance, the compile-time optimizer 118 may use the global statistics 310 to optimize the execution plan 312 and produce the optimized execution plan 314. During such optimization, the compile-time optimizer 118 may match sets of statistics collected by the collectors during the execution of the execution plan 304 to the expressions specified in the execution plan 312. The matching may be performed based on metadata in the form of hash values that captured the locations of the collectors in a directed acyclic graph, e.g., a query graph, of the execution plan 304. Each location may include information such as the signatures of the one or more inputs to the directed acyclic graph, as well as a chain of operators that operated on the input data before the input data reached a collector at the location.

Thus, the compile-time optimizer 118 may import the global statistics 310 using a stat-view matching technique based on the metadata. Statistics are matched in during the exploration stage in optimization, before implementing physical alternatives but after equivalent rewrites have been explored. The compile-time optimizer 118 may propagates the statistics offered at one location to equivalent semantic locations, e.g., when number of rows remains the same after a sort operation. For expressions with no direct statistics available, the compile-time optimizer 118 may make do by propagating statistics from nearby locations with apriori estimates on the behavior of operators that lie along a particular path.

Accordingly, the compile-time optimizer 118 may use cardinality, i.e., the number of rows observed at each collection point to help estimate operator selectivity and compare reordering alternatives. Along with selectivity, the computation costs of operations may be used by the compile-time optimizer 118 to determine an execution sequence for operations (e.g., whether an operation is worth doing now or later), as postponing an operation may actually reduce the amount of work that is eventually performed for the operation. Further, statistics with respect to computation costs, either alone or sometimes along with a size of the data in the job 104 to be processed, may help the compile-time optimizer 118 to determine a degree of parallelism for an operation, the number of partitions to use for the execution of the operations, and select operations to fit within a task. The compile-time optimizer 118 may also use the global statistics 326 to decide when implementations of broadcast join, self-join, or index join are appropriate, and/or other optimizations. Thus, once the compile-time optimizer 118 has produced the optimized execution plan 314 based on the statistics, the execution engine 112 may perform distributed execution 316 according to the optimized execution plan 314.

In scenario 318, the compiler 108 may translate a job script of a job into an execution plan 320. In some embodiments, the compiler 108 may have used fixed apriori estimates to select the execution plan 320 as an ideal plan from multiple possible execution plans for the job. The execution engine 112 may perform the distributed execution 322 of the operations that are specified for the tasks of the execution plan 320. During the distributed execution 306, the job manager 122 may perform statistics collection 324 to gather statistics from the collectors. Statistics from each collector may be sent from the collector along with task status reports to the job manager 122, at which point the job manager 122 may compose the received statistics into global statistics 326. For instance, the statistics collection 324 may be performed in a similar manner as the statistics collection 308.

In various embodiments, the run-time optimizer 120 may use the global statistics 326 to perform on-the-fly optimization of the execution plan 320. The on-the-fly optimization may produce optimized operations 328 that are executed by the execution engine 112. For example, optimization may include changing an order in which stages of operations are executed. Even stages that are pipelined with the currently executing stage may be changed, since all inter-task data flow happens through disk, and tasks in the map-reduce data processing system 100 generally write their outputs to disk to be subsequently read by independent tasks. Other global plan changes, for example, choosing different partition strategies, may be constrained by stages that have already run. Hence, the run-time optimizer 120 may perform the on-the-fly optimization with respect to the unexecuted tasks of the execution plan 320.

In some embodiments, as the optimized operations 328 are further executed via the distributed execution 322, the job manager 122 of the execution engine 112 may collect additional statistics via the statistics collection 324. In turn, the run-time optimizer 120 may further optimize the operations of the execution plan 320. Such repeated optimization may occur one or more times until the distributed execution 322 of operations in the execution plan 320 is completed. In some instances, the run-time optimizer 120 may use at least some of the techniques used by the compile-time optimizer 118 to perform the on-the-fly optimization.

Example Processes

Figure 4:
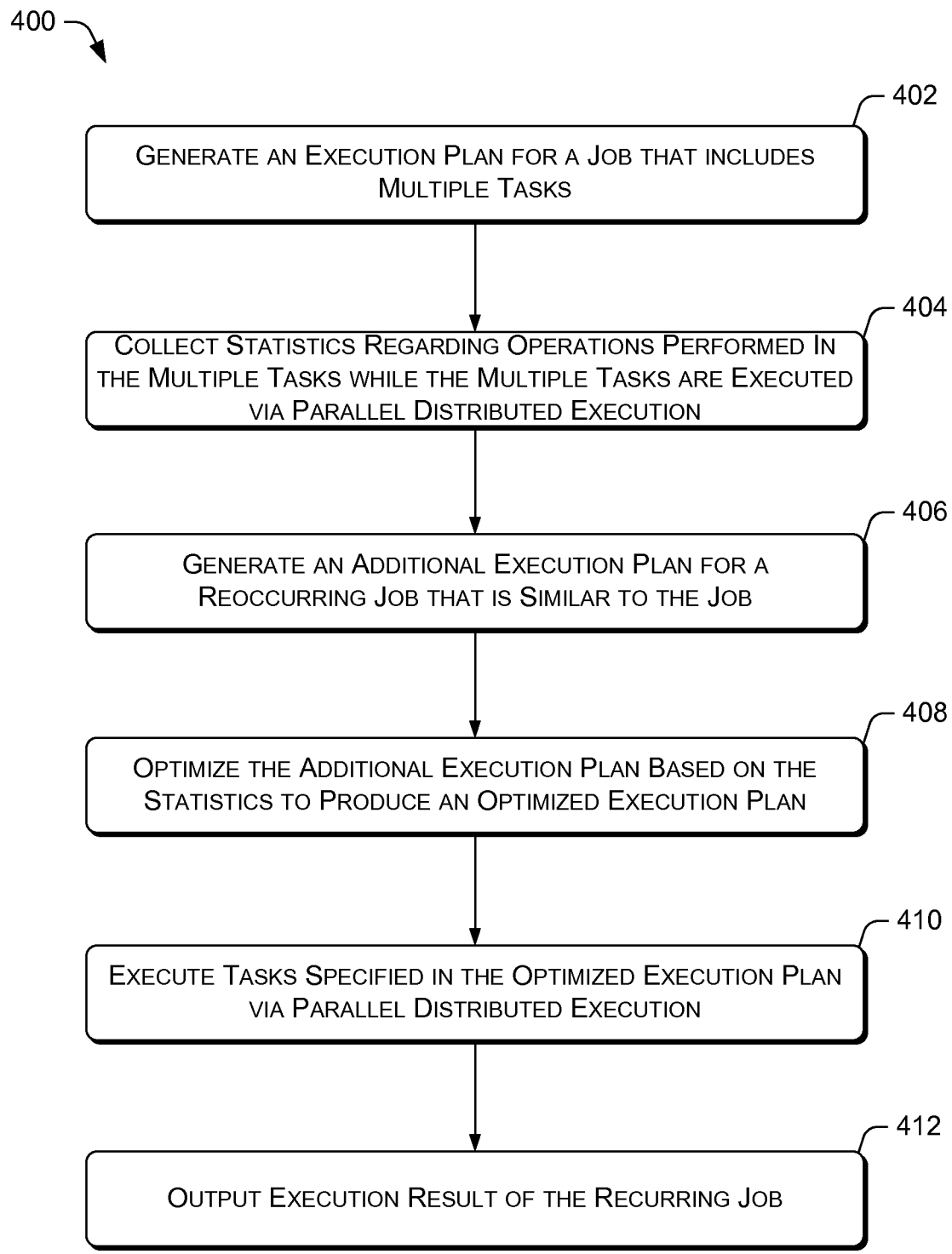
FIG. 4 is a flow diagram that illustrates an example process for using collected statistics from an execution of a current job to optimize the execution of a similar recurring job.
Figure 5:
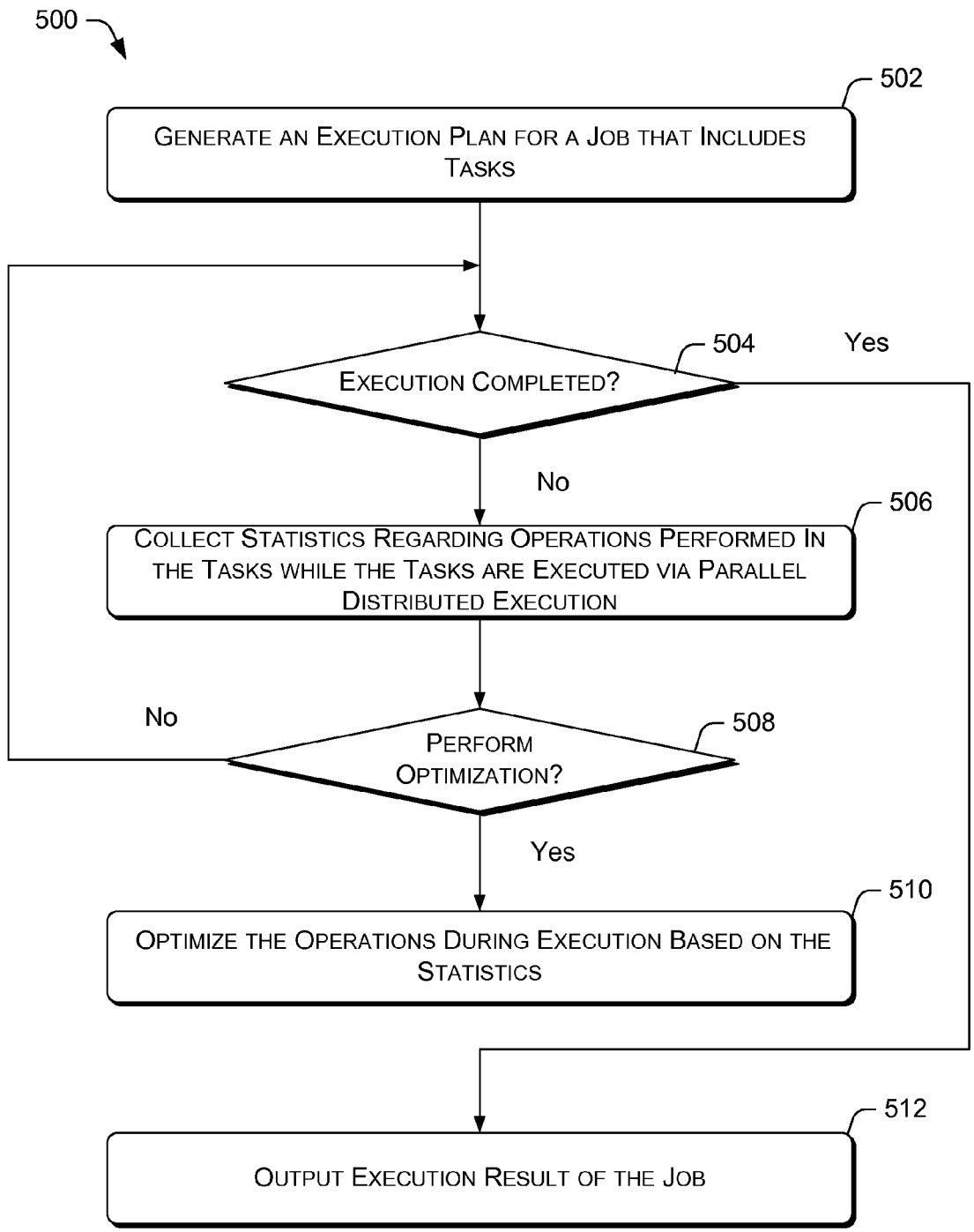
FIG. 5 is a flow diagram that illustrates an example process for using statistics collected during an execution of a job to perform on-the-fly optimization of the operations of the job.
Figure 6:
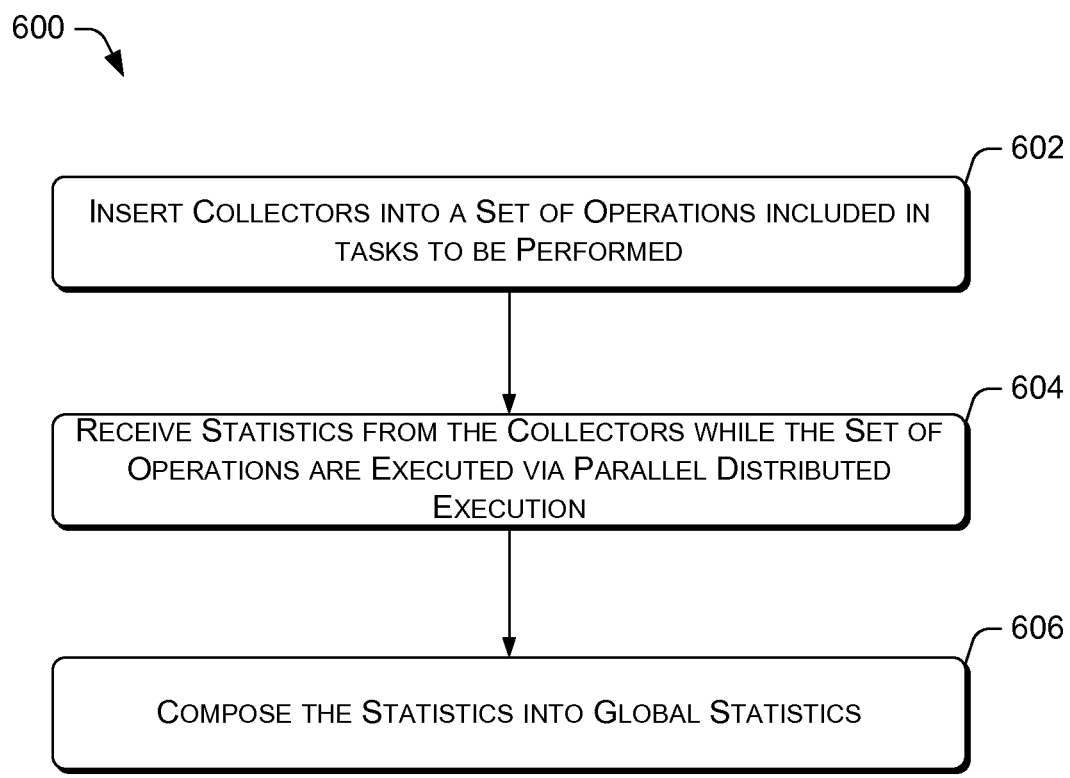
FIG. 6 is a flow diagram that illustrates an example process for collecting statistics regarding a set of operations that are executed according to an execution plan for a job.

FIGS. 4-6 describe various example processes for using statistical data collected during the execution of the tasks of a job by a distributed data parallel computation system to optimize the performance of the job or similar recurring jobs. The order in which the operations are described in each example process is not intended to be construed as a limitation, and any number of the described operations may be combined in any order and/or in parallel to implement each process. Moreover, the operations in each of the FIGS. 4-6 may be implemented in hardware, software, and a combination thereof. In the context of software, the operations represent computer-executable instructions that, when executed by one or more processors, cause one or more processors to perform the recited operations. Generally, computer-executable instructions include routines, programs, objects, components, data structures, and so forth that cause the particular functions to be performed or particular abstract data types to be implemented.

FIG. 4 is a flow diagram that illustrates an example process 400 for using collected statistics from an execution of a current job to optimize the execution of a similar recurring job.

At block 402, the compiler 108 may generate an execution plan (e.g., execution plan 304) for a job that includes multiple tasks, such as the tasks 224(1)-224(N). In various embodiments, the compiler 108 may translate a job script (e.g., job script 106) for a job (e.g., job 104) into an execution plan by generating code for executing the multiple tasks. In such embodiments, the compiler 108 may use statistical model, heuristics, or rules to guess the cost of various generated execution plans, and then select the execution plan that consumes the least amount of computation resources (e.g., processing power, memory, and/or processing time) as the execution plan to implement. The execution engine 112 may use the job manager 122 to orchestrate the execution of the tasks, in which the job manager issues tasks for execution when their inputs are ready, selects particular computing devices to run specific tasks, and reacts to result outliers and execution failures.

At block 404, the job manager 122 may collect statistics (e.g., the global statistics 310) regarding the performance of operations in the tasks while the tasks are executed via parallel distributed execution by the execution engine 112. For example, the job manager 122 may instrument at least one operation of each task with one or more collectors that gathers data on inputs, outputs, intermediate products, and/or so forth of the operation. The statistics gathered by the collectors on the execution of the tasks are fed to the job manager 122.

At block 406, the compiler 108 may generate an additional execution plan (e.g., execution plan 312) for a recurring job that is similar to the previous job. Accordingly, the execution plan for the previous job and the execution plan for the recurring job may have at least one task in common. For example, click logs for a website may be processed on a daily basis. Accordingly, a job to process a click log for a current day may involve the execution engine 112 performing a similar set of tasks as the tasks that are performed in a previous day by the execution engine 112, despite differences in the data values that are in the two clicks logs. Thus, the recurring job may share one or more tasks that include similar operations as the previous job.

At block 408, an compile-time optimizer 118 may optimize the additional execution plan based on the statistics (e.g., the global statistics 310) to produce an optimized execution plan, such as the optimized execution plan 314. For example, the compile-time optimizer 118 may use cardinality, i.e., the number of rows observed at each collection point to help estimate operator selectivity and compare reordering alternatives. Along with selectivity, the computation costs of operations may be used by the compile-time optimizer 118 to determine an execution sequence for operations (e.g., whether an operation is worth doing now or later), as postponing an operation may actually reduce the amount of work that is eventually performed by the operation. Further, statistics with respect to computation costs may help the compile-time optimizer 118 to determine degree of parallelism, the number of partitions, and select operations to fit within a task. The compile-time optimizer 118 may also use the global statistics to decide when choices of broadcast join, self-join, or index join are appropriate, and/or perform other optimizations.

At block 410, the execution engine 112 may execute tasks specified in the optimized execution plan via parallel distributed execution. In various embodiments, the execution engine 112 may use the job manager 122 to orchestrate the execution of the tasks, in which the job manager issues tasks for execution when their inputs are ready, selects particular computing devices to run specific tasks, and reacts to result outliers and execution failures. At block 412, the execution engine 112 may output execution result of the recurring job.

FIG. 5 is a flow diagram that illustrates an example process 500 for using statistics collected during an execution of a job to perform on-the-fly optimization of the operations of the job.

At block 502, the compiler 108 may generate an execution plan (e.g., execution plan 320) for a job that includes a plurality of tasks, such as the tasks 224(1)-224(N). In various embodiments, the compiler 108 may translate a job script (e.g., job script 106) for a job (e.g., job 104) into an execution plan by generating code for executing multiple tasks. In such embodiments, the compiler 108 may use statistical model, heuristics, or rules to guess the cost of various generated execution plans, and then select the execution plan that consumes the least amount of computation resources (e.g., processing power, memory, and/or processing time) as the execution plan to implement.

At decision block 504, the execution engine 112 may determine whether execution of the job is completed. Thus, if the execution engine 112 determines that execution is not completed ("No" at decision block 504), the process 500 may proceed to block 506.

At block 506, the job manager 122 of the execution engine 112 may collect statistics regarding operations performed in the tasks while the tasks are executed via parallel distributed execution by the execution engine 112. In various embodiments, the job manager 122 may orchestrate the execution of the tasks, in which the job manager issues tasks for execution when their inputs are ready, selects particular computing devices to run specific tasks, and reacts to result outliers and execution failures. Additionally, the job manager 122 may also instrument at least one operation of each task with one or more collectors that gathers data on inputs, outputs, intermediate products, and/or so forth of the operation. The statistics gathered by the collectors on the execution of the tasks are fed to the job manager 122.

At decision block 508, the run-time optimizer 120 may determine whether optimization of the operations is to be performed. In various embodiments, the run-time optimizer 120 may make such a determination based on the statistics that are continuously gathered by the job manager 122 as one or more additional operations are executed by the execution engine 112. Thus, if the run-time optimizer 120 determines that optimization is to be performed ("yes" at decision block 508), the process 500 may proceed to block 510.

At block 510, the run-time optimizer 120 of the execution engine 112 may perform one-the-fly optimization of the operations in the execution plan based on the statistics. The on-the-fly optimization may produce optimized operations (e.g., the optimized operations 328) for execution by the execution engine 112. For example, optimization may include changing an order in which stages of operations are executed. Other global plan changes, e.g., choosing different partition strategies, may be constrained by stages that have already run. Hence, the run-time optimizer 120 may perform the on-the-fly optimization with respect to the unexecuted tasks of the execution plan 320. However, if the run-time optimizer 120 determines at decision block 508 that optimization is not to be performed ("No" at decision block 508), the process 500 may loop back to block 504.

Returning to block 504, if the execution engine 112 determines that execution is completed ("Yes" at decision block 504), the process 500 may proceed to block 512. At block 512, the execution engine 112 may output execution result of the job.

In some embodiments, the process 400 and the process 500 may be performed sequentially. In other words, operations of a recurring job may be optimized by the compile-time optimizer 118 based on the statistics gathered during the execution of a previous similar job. Further, during the execution of the recurring job, the run-time optimizer 120 may further perform on-the-fly optimization of the operations of the recurring job.

FIG. 6 is a flow diagram that illustrates an example process 600 for collecting statistics regarding a set of operations that are executed according to an execution plan for a job. The process 600 may further illustrate the block 404 of the process 400 and/or the block 506 of the process 500.

At block 602, the job manager 122 may insert collectors into a set of operations included in tasks to be performed. The tasks may be specified by an execution plan for a job that is to be performed via parallel distributed execution by the execution engine 112. The set of operations excludes operations whose impact on data is predictable (e.g., the input size of a sort operation may be identical to the output size). In various embodiments, a collector may be in the form of a set of collection codes that are placed into an appropriate location in the data flow of an operator.

At block 604, the job manager 122 may receive statistics from the collectors as the set of operations are executed via the parallel distributed execution. In various embodiments, statistics from each collector may be sent from the collector along with task status reports to the job manager 122. The task status reports are heartbeat messages that are used by the job manager 122 to track and direct the execution of tasks and deal with execution problems as they arise.

At block 604, the job manager 122 may compose the statistics that are received from the collectors into global statistics, such as the global statistics 310. Accordingly, the statistics that are gathered locally at each of the collectors may be integrated to form statistics that affect the overall execution of the job.

The use of statistics collected during the parallel distributed execution of the tasks of a job may be used to optimize the performance of the job or similar recurring jobs. Such optimization may result in an optimized execution plan with reduced computation cost (e.g., computation resources, processing time, etc.) for the job or a similar recurring job. Such an optimized execution plan may be superior to an optimized execution plan for the same job that is produced using solely fixed apriori estimates.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as exemplary forms of implementing the claimed subject matter.

What is claimed is:

1. A computer storage medium storing computer-executable instructions that, when executed, cause one or more processors to perform acts comprising:
   generating a first execution plan for a job that includes a plurality of tasks;
   collecting statistics regarding operations performed in the plurality of tasks while the plurality of tasks are executed via parallel distributed execution;
   generating a second execution plan for a recurring job, the second execution plan having at least one task in common with the first execution plan for the job; and
   optimizing the second execution plan based at least on the statistics to produce an optimized execution plan, wherein the optimizing includes at least one of:
      reducing a number of parallelisms for operations at a tail end of the job; or
      replacing pair-wise joins of data with broadcast joins of data process by at least one of the operations.

2. The computer storage medium of claim 1, further comprising:
   executing a plurality of further tasks specified in the optimized execution plan to generate execution results for the recurring job; and
   outputting the execution results of the recurring job.

3. The computer storage medium of claim 2, further comprising:
   collecting additional statistics regarding additional operations performed in the further tasks while the further tasks are executed via parallel distributed execution; and
   optimizing the additional operations on-the-fly during the parallel distributed execution of the further tasks based at least on the additional statistics.

4. The computer storage medium of claim 1, wherein the generating the first execution plan includes translating a job script for the job into the first execution plan.

5. The computer storage medium of claim 1, wherein the collecting the statistics includes:
   inserting collectors into a set of operations selected from the operations performed in the tasks;
   receiving local statistical data from the collectors while the set of the operations are executed via parallel distributed execution; and
   composing the local statistical data provided by the collectors into the statistics.

6. The computer storage medium of claim 5, further comprising selecting the set of operations from the operations performed in the task by ignoring at least one operation that produces a predictable result.

7. The computer storage medium of claim 5, wherein the optimizing includes matching the statistics captured by the collectors to expressions specified in the second execution plan based at least on hash values that represent locations of the collectors in a query graph of the first execution plan.

8. The computer storage medium of claim 1, wherein the statistics include a first number of distinctive values in a data table column and a second number of values that repeat over a predetermined fraction of rows in the data table column, and wherein the optimizing includes avoiding skewing in partitioning of operations in the recurring job based at least on the first number and the second number.

9. The computer storage medium of claim 8, further comprising:
   estimating the first number via distributed hash sketching; and
   estimating the second number by at least receiving frequency estimates obtained by each collector, totaling up the frequency estimates, and tallying up distinct values, wherein each frequency estimate is obtained by a corresponding collector through lossy counting of a subset of data observed by a task that is monitored by the corresponding collector.

10. The computer storage medium of claim 1, wherein the optimizing includes at least one of:
    determining a sequence of operations based at least on operator selectivity and computation costs of the operations; or
    determining a degree of parallelism for the operations, a number of partitions for the operations, or operations to fit into a particular task based at least on the computation costs of the operations and a size of data to be processed.

11. A computer-implemented method, comprising:
    generating a first execution plan for a job that includes a plurality of tasks;
    collecting statistics regarding operations performed in the plurality of tasks while the plurality of tasks are executed via parallel distributed execution;
    optimizing a second execution plan for a recurring job based at least on the statistics to produce an optimized execution plan, the second execution plan having at least one task in common with the first execution plan, wherein the optimizing includes at least one of:
       reducing a number of parallelisms for operations at a tail end of the job; or
       replacing pair-wise joins of data with broadcast joins of data process by at least one of the operations;
    executing a plurality of further tasks specified in the optimized execution plan to generate execution results for the recurring job; and
    outputting the execution results of the recurring job.

12. The computer-implemented method of claim 11, further comprising:
    collecting additional statistics regarding additional operations performed in the further tasks while the further tasks are executed via parallel distributed execution; and
    optimizing the additional operations on-the-fly during the parallel distributed execution of the further tasks based at least on the additional statistics.

13. The computer-implemented method of claim 11, wherein the collecting the statistics includes:
    inserting collectors into a set of operations selected from the operations performed in the tasks;
    receiving local statistical data from the collectors while the set of the operations are executed via parallel distributed execution; and
    composing the local statistical data provided by the collectors into the statistics.

14. The computer-implemented method of claim 11, wherein the optimizing includes at least one of:
    determining a sequence of operations based at least on operator selectivity and computation costs of the operations; or
    determining a degree of parallelism for the operations, a number of partitions for the operations, or operations to fit into a particular task based at least on the computation costs of operations.

15. The computer-implemented method of claim 11, wherein the collecting the statistics includes:
    selecting a set of operations from the operations performed in the tasks by ignoring at least one operation that produces a predictable result;
    inserting collectors into the set of operations; and
    receiving at least some of the statistics from the collectors.

16. A computing device, comprising:
one or more processors; and
a memory that includes a plurality of computer-executable components executed by the one or more processors, comprising:
  a compiler that generates a first execution plan for a job that includes a plurality of tasks;
  at least one job manager that collects statistics regarding operations performed in the plurality of tasks while the plurality of tasks are executed via parallel distributed execution; and
  a compile-time optimizer that optimizes a second execution plan based at least on the statistics to produce an optimized execution plan, the second execution plan having at least one task in common with the first execution plan, wherein the compile-time optimizer is configured to perform at least one of:
    reducing a number of parallelisms for operations at a tail end of the job; or
    replacing pair-wise joins of data with broadcast joins of data process by at least one of the operations.

17. The computing device of claim 16, wherein the compiler generates the second execution plan for a recurring job that is similar to the job.

18. The computing device of claim 16, wherein the at least one job manager collects additional statistics regarding additional operations performed in further tasks of the second execution plan as the further tasks are executed via parallel distributed execution, and optimizes the additional operations on-the-fly during the parallel distributed execution of the further tasks based at least on the additional statistics.

19. The computing device of claim 16, wherein the at least one job manager collects the statistics by:
  inserting collectors into a set of operations selected from the operations performed in the tasks;
  receiving local statistical data from the collectors as the set of the operations are executed via parallel distributed execution; and
  composing the local statistical data provided by the collectors into the statistics.

20. The computing device of claim 16, wherein the statistics include a first number of distinctive values in a data table column and a second number of values that repeat over a predetermined fraction of rows in the data table column, and wherein the compile-time optimizer is configured to:
  avoid skewing in partitioning of operations in the recurring job based at least on the first number and the second number;
  estimate the first number via distributed hash sketching; and
  estimate the second number by at least receiving frequency estimates obtained by each collector, totaling up the frequency estimates, and tallying up distinct values, wherein each frequency estimate is obtained by a corresponding collector through lossy counting of a subset of data observed by a task that is monitored by the corresponding collector.

* * * * *